(12) United States Patent
Park et al.

(10) Patent No.: US 8,305,340 B2
(45) Date of Patent: Nov. 6, 2012

(54) TOUCH SENSITIVE DISPLAY DEVICE AND METHOD THEREOF

(75) Inventors: Jong-Woung Park, Seongnam-si (KR);
Joo-Hyung Lee, Gwacheon-si (KR);
Kee-Han Uh, Yongin-si (KR);
Young-Jun Choi, Suwon-si (KR);
Man-Seung Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/959,333

(22) Filed: Dec. 2, 2010

(65) Prior Publication Data

US 2011/0074722 A1 Mar. 31, 2011

Related U.S. Application Data

(63) Continuation of application No. 11/586,256, filed on Oct. 25, 2006, now Pat. No. 7,868,875.

(30) Foreign Application Priority Data

Oct. 26, 2005 (KR) ................ 10-2005-0101293

(51) Int. Cl.
*G09G 3/36* (2006.01)
(52) U.S. Cl. ..................................... 345/104
(58) Field of Classification Search .......... 345/104, 345/170–178
See application file for complete search history.

(56) References Cited

U.S. PATENT DOCUMENTS

| | | | | | |
|---|---|---|---|---|---|
| 4,698,460 A | * | 10/1987 | Krein et al. | .................. | 345/173 |
| 5,162,783 A | * | 11/1992 | Moreno | .................. | 345/175 |
| 5,241,308 A | * | 8/1993 | Young | .................. | 341/34 |
| 5,380,959 A | * | 1/1995 | Knowles | .................. | 178/18.04 |
| 5,565,658 A | * | 10/1996 | Gerpheide et al. | ......... | 178/18.02 |
| 5,610,629 A | * | 3/1997 | Baur | .................. | 345/104 |
| 2004/0150629 A1 | * | 8/2004 | Lee | .................. | 345/173 |
| 2004/0227743 A1 | * | 11/2004 | Brown | .................. | 345/204 |
| 2006/0097991 A1 | * | 5/2006 | Hotelling et al. | ............ | 345/173 |

FOREIGN PATENT DOCUMENTS

| | | |
|---|---|---|
| CN | 1722210 A | 1/2006 |
| EP | 372964 | 6/1990 |
| JP | 07-044305 A | 2/1995 |
| JP | 07-084723 A | 3/1995 |
| JP | 07-121298 A | 5/1995 |
| JP | 07-295745 A | 11/1995 |
| JP | 07-325665 A | 12/1995 |
| JP | 08-006722 A | 1/1996 |
| JP | 09-073367 A | 3/1997 |
| JP | 09-080467 A | 3/1997 |
| JP | 10-040007 A | 2/1998 |
| JP | 11-143633 A | 5/1999 |
| JP | 2000-066837 A | 3/2000 |
| JP | 2005284661 | 10/2005 |
| KR | 10-0226812 B1 | 7/1999 |
| KR | 10-2001-0061329 A | 7/2001 |

* cited by examiner

*Primary Examiner* — Bipin Shalwala
*Assistant Examiner* — Carolyn R Edwards
(74) *Attorney, Agent, or Firm* — Cantor Colburn LLP (57) ABSTRACT

The present invention relates to a touch sensitive display device, the display device including a display panel unit, a sensing unit formed on the display panel unit, receiving a sensor control signal, and generating a sensor data signal based on a touch exerted on the display panel unit, an output unit generating a sensing signal based on the sensor data signal from the sensing unit, and a compensation unit adjusting the sensor control signal such that the sensing signal is bounded in a predetermined range.

6 Claims, 9 Drawing Sheets

TOUCH SENSITIVE DISPLAY DEVICE AND METHOD THEREOF

This application is a continuation application of U.S. patent application Ser. No. 11/586,256 filed on Oct. 25, 2006, which claims priority to Korean Patent Application No. 10-2005-0101293, filed on Oct. 26, 2005 and all the benefits accruing therefrom under 35 U.S.C. §119, the contents of which in its entirety are herein incorporated by reference.

BACKGROUND OF THE INVENTION (a) Field of the Invention

The present invention relates to a display device and a method thereof. More particularly, the present invention relates to a touch sensitive display device and a method of improving touch determination.

(b) Description of the Related Art

A liquid crystal display ("LCD") includes a pair of panels provided with pixel electrodes and a common electrode, and a liquid crystal layer with dielectric anisotropy interposed between the panels. The pixel electrodes are arranged in a matrix and connected to switching elements such as thin film transistors ("TFTs") such that they receive display data voltages row by row. The common electrode covers the entire surface of one of the two panels and it is supplied with a common voltage.

A pixel electrode, corresponding portions of the common electrode, and corresponding portions of the liquid crystal layer form a liquid crystal capacitor that is a basic element of a pixel along with a switching element connected to the liquid crystal capacitor.

The LCD generates electric fields by applying voltages to the pixel electrodes and the common electrode, and varies the strength of the electric fields to adjust the transmittance of light passing through the liquid crystal layer to display images.

A touch screen panel is an apparatus in which a finger or a stylus contacts to write characters, to draw pictures, or to click icons to instruct a device such as a computer to execute instructions. A display device such as an LCD that includes a touch screen panel attached thereon has its own mechanism to determine whether and where a touch occurs. However, an LCD provided with a touch screen panel has a high manufacturing cost due to the cost of the touch screen panel, low productivity due to a process step for attaching the touch screen panel to the LCD, a reduction of luminance of the LCD, an increase of the thickness of the LCD, etc.

Sensors including TFTs or variable capacitors have been incorporated into display areas for displaying images in an LCD instead of employing a touch screen panel. Such sensors sense a variation of light incident on a panel or of pressure exerted on a panel to inform the LCD whether and where a touch of a user's finger, etc., occurs.

Sensing signals generated based on output signals of the sensors may be varied depending on peripheral conditions such as temperature, the degradation of the sensors, etc. In addition, the sensors may have deviations for every LCD, so the levels of the sensing signals may not be uniform. Accordingly, it may be difficult to exactly determine whether and where a touch occurs based on such sensing signals.

BRIEF SUMMARY OF THE INVENTION

A display device according to exemplary embodiments of the present invention includes a display panel unit, a sensing unit formed on the display panel unit, receiving a sensor control signal, and generating a sensor data signal based on a touch exerted on the display panel unit, an output unit generating a sensing signal based on the sensor data signal from the sensing unit, and a compensation unit adjusting the sensor control signal such that the sensing signal is bounded in a predetermined range.

The display device may further include a detecting unit generating a feedback signal based on the sensing signal and supplying the feedback signal to the compensation unit. The compensation unit may adjust the sensor control signal based on an operating signal, and the operating signal may be difference between a target value and the feedback signal. The compensation unit may adjust the sensor control signal such that the sensing signal is substantially equal to the target value.

The sensor control signal (Vc) may be given by $$Vc = Vc' + Kp \times ev(t) + Ki \times \int_0^t ev(\tau)d\tau + Kd \times \frac{dev(\tau)}{d(\tau)},$$

where Vc' denotes a previous value of the control signal, Kp denotes a proportional gain, Ki denotes an integral gain, Kd denotes a derivative gain, and ev denotes the operating signal. The compensation unit may control the sensing signal when the sensing signal is outside of the predetermined range. The compensation unit may not adjust the sensor control signal when the target value is equal to the feedback signal.

The compensation unit may perform one of proportional control, proportional-integral control, and proportional-integral-derivative control. The compensation unit may be implemented as an analog circuit or a digital circuit.

The sensing unit may include a variable capacitor Cv and a reference capacitor Cp connected to the variable capacitor Cv, and a capacitance of the variable capacitor Cv may have a capacitance depending on a pressure following a touch. The display device may further include a sensor data line for transmitting the sensor data signal and connected between the variable capacitor Cv and the reference capacitor Cp. The display device may further include a reset transistor connected to the sensor data line and supplying the sensor control signal to the sensor data line. The output unit may include an output transistor connected to the sensor data line and generating an output signal based on the sensor data signal. The output unit may further include an amplifier for generating the sensing signal based on the output signal of the output transistor. The plurality of display panels may include a first panel, a second panel facing the first panel, and an LC layer interposed between the first panel and the second panel. The variable capacitor may include a first electrode disposed on the first panel and a second capacitive electrode formed on the second panel.

The sensing unit may alternatively include a photo-sensing element sensing light following a touch to generate a photocurrent. The photo-sensitive element may have an input terminal connected to an input line, a control terminal connected to the sensor control signal, and an output terminal, and the photo-sensing unit may output the photocurrent through the output terminal.

The display device may further include a sensor data line for transmitting the sensor data signal and a switching element for sending the photocurrent from the photo-sensitive element to the sensor data line as the sensor data signal.

A method of improving a touch sensing operation in a touch sensitive display device according to exemplary embodiments of the present invention includes applying a sensor control signal to a sensor data line, generating a sensor data signal from a sensing unit connected to the sensor data line based on a touch exerted on the display device, generating a sensing signal based on the sensor data signal, and bounding the sensing signal within a preset range by adjusting the sensor control signal applied to the sensor data line.

Adjusting the sensor control signal may include calculating the sensor control signal based on a previous value of the sensor control signal and an operating signal, the operating signal being a difference between a feedback signal based on the sensing signal and a target value of the sensing signal.

BRIEF DESCRIPTION OF THE DRAWINGS

The present invention will become more apparent by further describing exemplary embodiments thereof with reference to the accompanying drawings, in which.

DETAILED DESCRIPTION OF THE INVENTION

The present invention will be described more fully hereinafter with reference to the accompanying drawings, in which preferred embodiments of the invention are shown. This invention may, however, be embodied in many different forms and should not be construed as limited to the exemplary embodiments set forth herein. In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, the term "and/or" includes any and all combinations of one or more of the associated listed items.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising" or "includes" and/or "including" when used in this specification specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein may be interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

A liquid crystal display ("LCD") as an example of a display device according to an exemplary embodiment of the present invention now will be described with reference to FIG. 1 to FIG. 3B.

Figure 1:
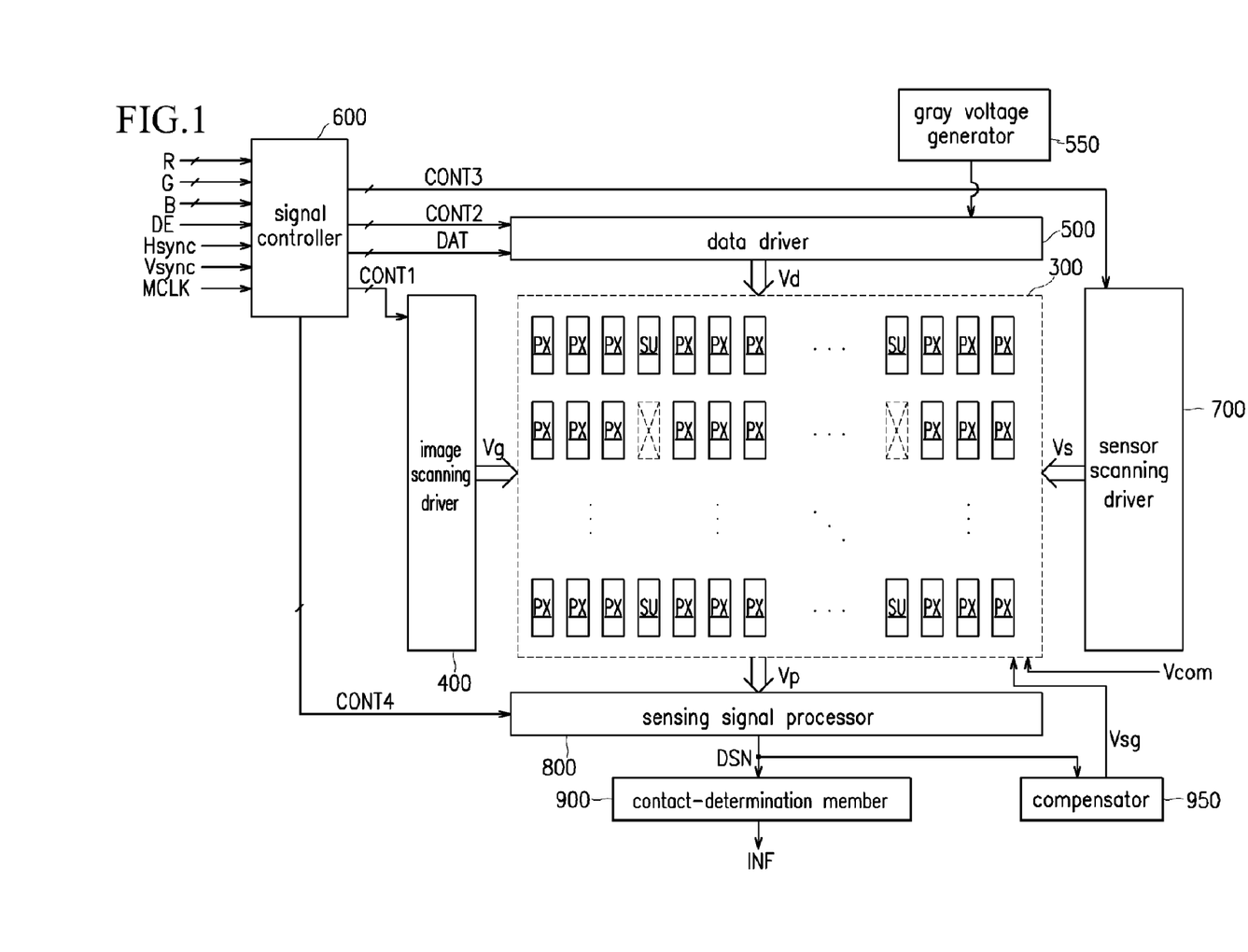
FIG. 1 is a block diagram of an exemplary liquid crystal display device ("LCD") according to an exemplary embodiment of the present invention.
Figure 2:
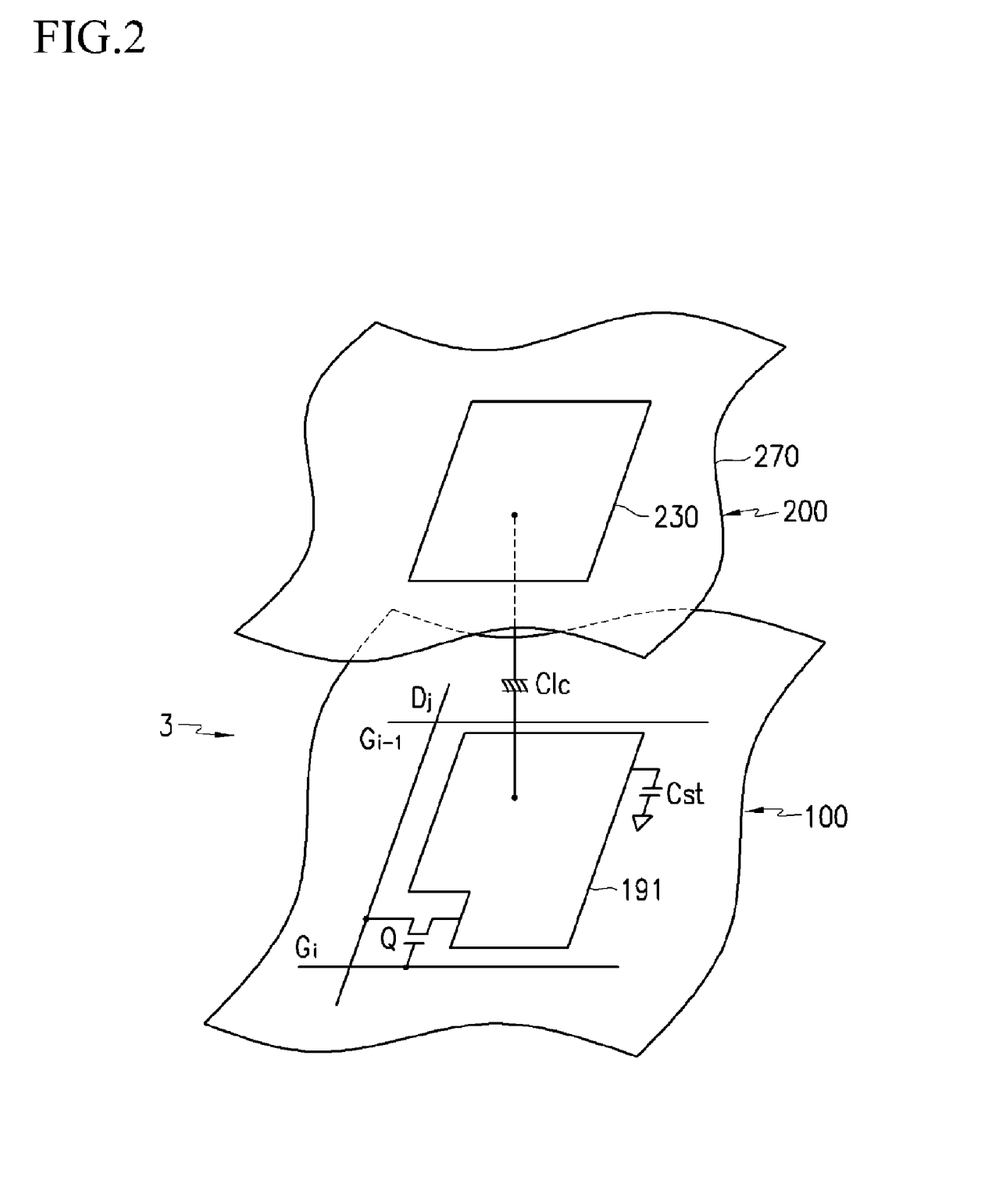
FIG. 2 is an equivalent circuit diagram of an exemplary pixel of an exemplary LCD according to an exemplary embodiment of the present invention.
Figure 3A:
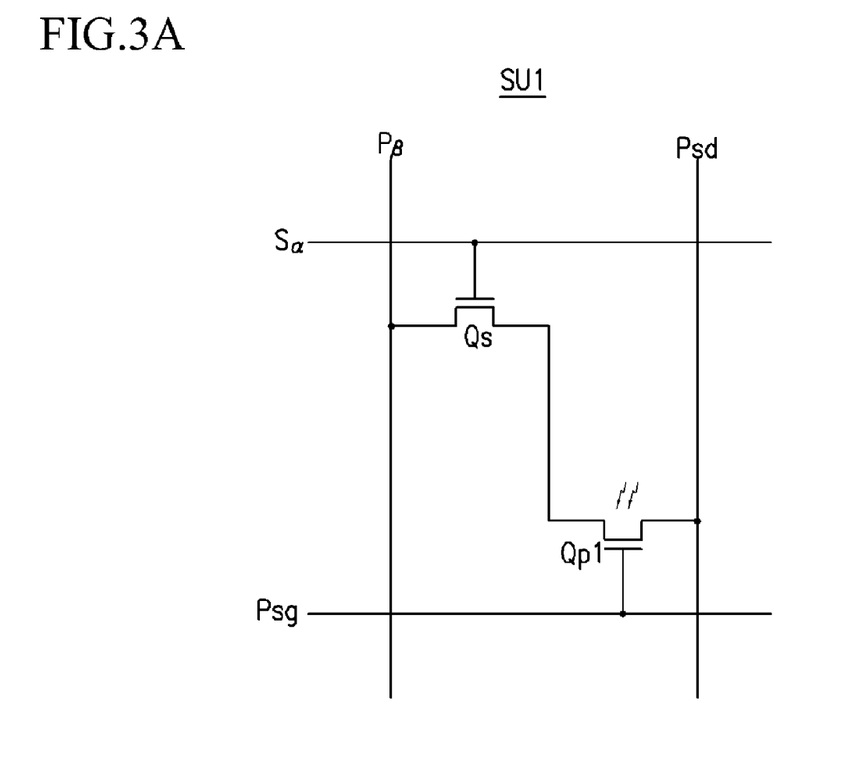
FIG. 3A and FIG. 3B are equivalent circuit diagrams of exemplary sensing units of exemplary LCDs according to exemplary embodiments of the present invention.
Figure 3B:
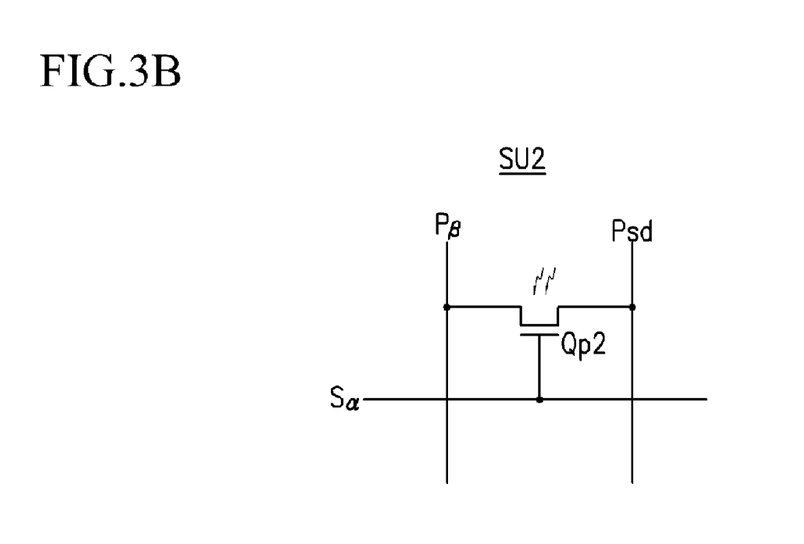

FIG. 1 is a block diagram of an exemplary LCD according to an exemplary embodiment of the present invention, FIG. 2 is an equivalent circuit diagram of an exemplary pixel of an exemplary LCD according to an exemplary embodiment of the present invention, and FIG. 3A and FIG. 3B are equivalent circuit diagrams of exemplary sensing units of exemplary LCDs according to exemplary embodiments of the present invention.

Referring to FIG. 1, an LCD includes a liquid crystal ("LC") panel assembly 300, a display or image scanning driver 400, a display or image data driver 500, a sensor scanning driver 700, a sensing signal processor 800, a compensation unit or compensator 950, a gray voltage generator 550, a touch determination unit or contact determination member 900, and a signal controller 600.

Referring to FIG. 1, the LC panel assembly 300 includes a plurality of pixels PX arranged substantially in a matrix and a plurality of sensing units SU arranged substantially in a matrix. Referring to FIG. 2, FIG. 3A and FIG. 3B, the LC panel assembly 300 further includes a plurality of display signal lines $G_i$ and $D_j$ (where i and j are natural numbers) connected to the pixels PX and a plurality of sensing signal lines $S_\alpha$, $P_\beta$, Psg, and Psd (where $\alpha$ and $\beta$ are natural numbers) connected to the sensing units SU.

In the equivalent circuit diagram shown in FIG. 2, the LC panel assembly 300 includes a thin film transistor ("TFT") array panel or lower panel 100, a common electrode panel or upper panel 200 facing the TFT array panel 100, a liquid crystal layer 3 interposed between the panels 100 and 200, and a plurality of elastic spacers (not shown) for maintaining a gap between the two panels 100 and 200. The LC panel assembly 300 may further include at least one polarizer (not shown) provided thereon. For example, first and second polarized films may be disposed on the panels 100 and 200 to adjust a transmission direction of light externally provided into the panels 100 and 200 in accordance with an aligned direction of the liquid crystal layer 3. The first and second polarized films may have first and second polarized axes thereof substantially perpendicular to each other.

The display signal lines include a plurality of display scanning lines $G_i$ transmitting display scanning signals Vg from the display scanning driver 400 and a plurality of display data lines $D_j$ transmitting display data signals Vd from the display data driver 500.

The plurality of sensor signal lines include a plurality of sensor scanning lines $S_\alpha$ transmitting sensor scanning signals Vs from the sensor scanning driver 700, a plurality of sensor data lines $P_\beta$ transmitting sensor data signals Vp to the sensing signal processor 800, a plurality of control voltage lines Psg transmitting a sensor control voltage Vsg from the compensation unit 950, and a plurality of input voltage lines Psd transmitting a sensor input voltage.

The signal lines $G_i$, $D_j$, $S_\alpha$, $P_\beta$, Psg, and Psd are disposed on the TFT array panel 100. The display scanning lines $G_i$, the sensor scanning lines $S_\alpha$, and the control voltage lines Psg extend substantially in a row direction, a first direction, and substantially parallel to each other, while the display data lines $D_j$, sensor data lines $P_\beta$ and the input voltage lines Psd extend substantially in a column direction, a second direction, and substantially parallel to each other. The first direction may be substantially perpendicular to the second direction.

Each pixel PX includes a switching element Q, such as a TFT, connected to the display signal lines $G_i$ and $D_j$, and a liquid crystal capacitor Clc and a storage capacitor Cst connected to the switching element Q. In alternative embodiments, the storage capacitor Cst may be omitted.

The switching element Q is disposed on the TFT array panel 100 and it has three terminals, i.e., a control terminal such as a gate electrode connected to a display scanning line $G_i$, an input terminal such as a source electrode connected to a display data line $D_j$, and an output terminal such as a drain electrode connected to the LC capacitor Clc and the storage capacitor Cst.

The liquid crystal capacitor Clc includes a pixel electrode 191 disposed on the TFT array panel 100 and a common electrode 270 disposed on the common electrode panel 200 as two terminals. The LC layer 3 disposed between the two electrodes 191 and 270 functions as a dielectric of the LC capacitor Clc. The pixel electrode 191 is connected to the switching element Q, such as to the output terminal of the switching element Q, and the common electrode 270 is supplied with a common voltage Vcom and covers an entire surface, or substantially an entire surface, of the common electrode panel 200. In alternative embodiments, the common electrode 270 may instead be provided on the TFT array panel 100, and at least one of the electrodes 191 and 270 may have a shape of a bar or stripe.

The storage capacitor Cst is an auxiliary capacitor for the LC capacitor Clc. The storage capacitor Cst includes the pixel electrode 191 and a separate signal line (not shown), which is provided on the TFT array panel 100, overlaps the pixel electrode 191 via an insulator, and is supplied with a predetermined voltage such as the common voltage Vcom. Alternatively, the storage capacitor Cst includes the pixel electrode 191 and an adjacent gate line $G_{i-1}$ called a previous gate line, which overlaps the pixel electrode 191 via an insulator.

For color display, each pixel PX uniquely represents one of a set of colors, such as primary colors, (i.e., spatial division) or each pixel PX sequentially represents the colors in turn (i.e., temporal division) such that a spatial or temporal sum of the colors are recognized as a desired color. An example of a set of the colors includes red, green, and blue. FIG. 2 shows an example of the spatial division in which each pixel PX includes a color filter 230 representing one of the colors in the set of colors in an area of the common electrode panel 200 facing the pixel electrode 191. Alternatively, the color filter 230 may be provided on or under the pixel electrode 191 on the TFT array panel 100.

A set of three pixels PX that represent three primary colors or three colors in the set of colors, such as red, green, and blue, and are disposed adjacent to one another are referred to as a dot, which is a basic unit of an image. The numbers of rows and columns of the dots represent the resolution of the LCD. According to another exemplary embodiment, a dot may include four or more pixels PX, and in this case, some of the pixels PX may represent white color.

Each of the sensing units SU may have one of the structures shown in FIG. 3A and FIG. 3B.

The sensing unit SU1 shown in FIG. 3A includes a sensing element Qp1 and a switching element Qs.

The sensing element Qp1 has three terminals, i.e., a control terminal connected to a control voltage line Psg, an input terminal connected to an input voltage line Psd, and an output terminal connected to the switching element Qs. The sensing element Qp1 includes a photoelectric material that generates a photocurrent upon receipt of light. An example of the sensing element Qp1 is a TFT having an amorphous silicon ("a-Si") or polysilicon channel that can generate a photocurrent. The sensor control voltage Vsg applied to the control terminal of the sensing element Qp1 from the control voltage line Psg is sufficiently low or sufficiently high to maintain the sensing element Qp1 in an off state in the absence of incident light. The sensor input voltage applied to the input terminal of the sensing element Qp via the input voltage line Psd is sufficiently high to maintain the photocurrent flowing toward the switching element Qs.

The photocurrent and an operation range of the sensing element Qp1 are determined depending on the sensor control voltage Vsg transmitted by the control voltage lines Psg. Accordingly, the photocurrent generated by the sensing element Qp1 may be controlled by adjusting the sensor control voltage Vsg. Otherwise, the photocurrent of the sensing element Qp1 may be controlled by adjusting the sensor input voltage transmitted by the input voltage lines Psd.

The switching element Qs also has three terminals, i.e., a control terminal connected to a sensor scanning line $S_\alpha$, an output terminal connected to a sensor data line $P_\beta$, and an input terminal connected to the sensing element Qp1. The switching element Qs outputs a sensor output signal to the sensor data line $P_\beta$ in response to the sensor scanning signal Vs from the sensor scanning line $S_\alpha$. The sensor output signal may be the photocurrent from the sensing element Qp1.

The sensing unit SU2 shown in FIG. 3B includes a sensing element Qp2 connected to the sensor signal lines $S_\alpha$, $P_\beta$, and Psd, but includes no switching element.

The sensing element Qp2 also has three terminals, i.e., a control terminal connected to a sensor scanning line $S_\alpha$, an input terminal connected to an input voltage line Psd, and an output terminal connected to a sensor data line $P_\beta$. The sensing element Qp2 includes a photoelectric material that generates a photocurrent upon receipt of light, and outputs a sensor output signal to the sensor data line $P_\beta$ in response to the sensor scanning signal Vs from the sensor scanning line $S_\alpha$. The sensing element Qp2 may output the sensor output signal when the sensor scanning signal Vs is equal to or higher than a predetermined voltage. The sensor output signal and an operation range of the sensing element Qp2 are determined depending on the predetermined voltage. Accordingly, the sensor output signal generated by the sensing element Qp2 may be controlled by adjusting the predetermined voltage. Otherwise, the sensor output signal of the sensing element Qp2 may be controlled by adjusting the sensor input voltage from the input voltage line Psd. When the sensing unit SU2 is employed, the control voltage line Psg shown in FIG. 3A may be omitted.

Here, the switching elements Q and Qs, and the sensing elements Qp1 and Qp2 may be TFTs including a-Si or polycrystalline silicon.

The sensing unit SU is disposed between two adjacent pixels PX, and the concentration of the sensing unit SU may be approximately a quarter of the concentration of the dots, where a dot includes a set of different colored pixels PX and is the basic unit for representing a color and determining the resolution of the LCD. When the concentration of the sensing unit SU is a quarter of the concentration of the concentration of the dots, for example, the number of the sensing units SU in a row may be a half of the number of the dots in a row, and the number of the sensing units SU in a column may be a half of the number of the dots in a column. FIG. 1 shows that the pixels PX and the sensing units SU form a matrix altogether. The pixels PX and the sensing units SU form independent columns, and a column of the sensing units SU appear every three columns of pixels PX when there are three differently colored pixels, e.g. a red pixel, a green pixel, and a blue pixel. There are sites having no sensing unit SU, which is denoted by "X," in each column of the sensing units SU. Thus, there may be pixel rows and pixel columns without the sensing units SU.

The LCD having the above-described concentrations of the sensing units SU and the dots may be applied to a precision application such as character recognition. The sensing unit resolution may be changed. For example, the concentration of sensing units SU may be more or less than the above-described ¼ concentration of the concentration of the dots.

In the meantime, each of the sensing units SU may be disposed in a unit area enclosed by a pair of two adjacent display scanning lines Gi and a pair of two adjacent display data lines Dj along with a pixel PX, or may be disposed over two unit areas that include two pixels PX.

Two adjacent sensor scanning lines $S_\alpha$ may be connected to each other such that the sensor output signals of two sensing units SU connected to the two adjacent sensor scanning lines $S_\alpha$, which may be adjacent in a column and connected to the same sensor data line $P_\beta$, are superposed in the sensor data line $P_\beta$ to be outputted as a sensor data signal Vp. The sensor data signals Vp formed by superposing sensor output signals may reduce the variation of the characteristics of the sensing units SU and may have a doubled signal-to-noise ratio to contain more precise touch information. In this case, the actual resolution of the array of the sensing units SU may be equal to a half of the number of the sensing units SU.

Referring to FIG. 1 again, the gray voltage generator 550 generates two sets of gray voltages related to transmittance of the pixels PX. The gray voltages in a first set have a positive polarity with respect to the common voltage Vcom, while the gray voltages in a second set have a negative polarity with respect to the common voltage Vcom.

The display scanning driver 400 is connected to the display scanning lines Gi of the LC panel assembly 300, and synthesizes a gate-on voltage and a gate-off voltage, such as a first high voltage and a first low voltage respectively, to generate the display scanning signals Vg for application to the display scanning lines Gi.

The display data driver 500 is connected to the display data lines Dj of the LC panel assembly 300, and applies display data signals Vd, which are selected from the gray voltages supplied from the gray voltage generator 550, to the display data lines Dj. However, if the gray voltage generator 550 supplies only a limited number of gray voltages (which are referred to as "reference gray voltages") instead of all gray voltages, the display data driver 500 divides the reference gray voltages to generate the display data signals Vd.

The sensor scanning driver 700 is connected to the sensor scanning lines $S_\alpha$ of the LC panel assembly 300 and applies the sensor scanning signals Vs in response to the sensor scanning control signals CONT3, which are composed of a gate-on voltage and a gate-off voltage, to the sensor scanning lines $S_\alpha$. Alternatively, each of the sensor scanning signals Vs may be composed of a high voltage causing the sensing units Qp2 to output the sensor output signals and a low voltage preventing the sensing units Qp2 from outputting the sensor output signals. The levels of the high voltage and the low voltage may depend on the operation range of the sensing units Qp2.

The sensing signal processor 800 is connected to the sensor data lines $P_\beta$ of the LC panel assembly 300. The sensing signal processor 800 receives the sensor data signals Vp from the sensor data lines $P_\beta$, processes, for example amplifies and filters the sensor data signals Vp, and analog-to-digital converts the sensor data signals Vp to generate digital sensor data signals DSN. One sensor data signal Vp flowing in one sensor data line $P_\beta$ at a time includes one sensor output signal outputted from one sensing element Qp1 or Qp2 or two or more sensor output signals outputted from two or more sensing elements Qp1 or Qp2.

The touch determination unit 900 receives the digital sensor data signals DSN, appropriately processes the digital sensor data signals DSN to determine whether and where a touch occurs, and sends information INF on the occurrence and the position of a touch to an external device.

The compensation unit or compensator 950 receives the digital sensor signals DSN from the sensing signal processor 800, and adjusts the sensor control voltage Vsg for the sensing units SU1 and the high voltage of the sensor scanning signals Vs for the sensing units SU2 until the digital sensor signals DSN are bounded in a predetermined range, as will be further described below. Alternatively, the compensation unit 950 may adjust the sensor input voltage for the sensing units SU. Otherwise, the compensation unit 950 may perform such an operation based on the analog sensor data signals before being converted into the digital sensor signals DSN.

The signal controller 600 controls the display scanning driver 400, the display data driver 500, the sensor scanning driver 700, the sensing signal processor 800, etc.

Each of the processing units 400, 500, 550, 600, 700, 800, 900, and 950 may include at least one integrated circuit ("IC") chip directly mounted on the LC panel assembly 300. However, the IC chip may be mounted on a flexible printed circuit ("FPC") film in a tape carrier package ("TCP") type, which is attached to the LC panel assembly 300, or mounted on a separate printed circuit board ("PCB" not shown). Alternately, at least one of the processing units 400, 500, 550, 600, 700, 800, 900, and 950 may be integrated into the LC panel assembly 300 along with the signal lines $G_i$, $D_j$, $S_\alpha$, and $P_\beta$, TFTs Q, Qs, Qp1, and Qp2, etc. Alternatively, all the processing units 400, 500, 550, 600, 700, 800, 900, and 950 may be integrated into a single IC chip, but at least one of the processing units 400, 500, 550, 600, 700, 800, 900, and 950 or at least one circuit element included in the processing units 400, 500, 550, 600, 700, 800, 900, and 950 may be disposed out of the single IC chip.

Now, the display operation and the sensing operation of the above-described LCD will be further described.

The signal controller 600 is supplied with input image signals R, G, and B and input control signals for controlling the display thereof from an external graphics controller (not shown). The input image signals R, G, and B include luminance information of each pixel PX, and they have a predetermined number of grays, for example 1024 ($=2^{10}$), 256 ($=2^8$), or 64 ($=2^8$) grays. The input control signals include, for example, a vertical synchronization signal Vsync, a horizontal synchronization signal Hsync, a main clock signal MCLK, a data enable signal DE, etc.

On the basis of input image signal R, G, and B and the input control signals, the signal controller 600 processes the image signals R, G, and B to be suitable for the operation of the LC display panel 300 and the display data driver 500, and generates display scanning control signals CONT1, display data control signals CONT2, sensor scanning control signals CONT3, and sensor data control signals CONT4. The signal controller 600 then sends the display scanning control signals CONT1 to the display scanning driver 400, the display data control signals CONT2 and the processed image signals DAT to the display data driver 500, the sensor scanning control signals CONT3 to the sensing scanning driver 700, and the sensor data control signals CONT4 to the sensing signal processor 800.

The display scanning control signals CONT1 include a display scanning start signal STV for instructing a display scanning start operation, and at least one clock signal for controlling the output time of the gate-on voltage Von. The display scanning control signals CONT1 may further include an output enable signal OE for defining the duration of the gate-on voltage Von.

The display data control signals CONT2 include a horizontal synchronization start signal STH for informing a start of transmission of the image signals DAT for a row of pixels PX, a load signal LOAD for instructing application of the display data signals Vd to the display data lines $D_1$-$D_m$, and a data clock signal HCLK. The display data control signals CONT2 may further include an inversion signal RVS for reversing the polarity of the voltages of the display data signals Vd relative to the common voltage Vcom (simply referred to as "the polarity of the display data signals" hereinafter).

Responsive to the display data control signals CONT2 from the signal controller 600, the display data driver 500 receives a packet of the digital image signals DAT for the row of pixels PX, converts the digital image signals DAT into analog display data signals Vd selected from the gray voltages supplied from the gray voltage generator 550, and applies the analog display data signals Vd to the display data lines Dj.

The display scanning driver 400 applies the gate-on voltage Von to a display scanning line Gi in response to the display scanning control signals CONT1 from the signal controller 600, thereby turning on the switching elements Q connected thereto. The display data signals Vd applied to the display data lines Dj are then supplied to the pixels PX through the activated switching elements Q. A gate-off voltage Voff may be applied to the display scanning line Gi via the display scanning driver 400 to turn off the switching elements Q connected thereto.

The difference between the voltage of a display data signal Vd and the common voltage Vcom applied to a pixel PX is represented as a voltage across the LC capacitor Clc of the pixel PX, which is referred to as a pixel voltage. The LC molecules in the LC capacitor Clc have orientations depending on the magnitude of the pixel voltage, and the molecular orientations determine the polarization of light passing through the LC layer 3. The polarizer(s) converts light polarization into light transmittance to display images.

By repeating this procedure by a unit of a horizontal period (also referred to as "1H" and that is equal to one period of the row synchronization signal Hsync and the data enable signal DE), all display scanning lines Gi are sequentially supplied with the gate-on voltage Von, thereby applying the display data signals Vd to all pixels PX via the display data lines Dj to display an image for a frame.

When the next frame starts after one frame finishes, the inversion control signal RVS applied to the data driver 500 is controlled such that the polarity of the display data signals Vd is reversed (which is referred to as "frame inversion").

The inversion control signal RVS may also be controlled such that the polarity of the display data signals Vd flowing in a data line are periodically reversed during one frame (for example, row inversion and dot inversion), or the polarity of the display data signals Vd in one packet are reversed (for example, column inversion and dot inversion).

In the meantime, the sensor scanning driver 700 supplies the gate-on voltage to a sensor scanning line $S_\alpha$ in response to the sensor scanning control signals CONT3 from the signal controller 600 to turn on the switching elements Qs connected thereto. With reference to the sensing units SU1 shown in FIG. 3A, the sensor output signals Vp from the sensing element Qp1 are loaded on the sensor data lines $P_\beta$ through the activated switching elements Qs to become sensor data voltages Vp. Alternatively, with reference to the sensing units SU2 shown in FIG. 3B, the sensor scanning driver 700 may supply the above-described high voltage to a sensor scanning line $S_\alpha$, and accordingly the sensing elements Qp2 connected to the sensor scanning line $S_\alpha$ may output their sensor output signals to the sensor data lines $P_\beta$. The sensor output signals loaded on the sensor data lines $P_\beta$ become sensor data signals Vp.

The sensing signal processor 800 reads the sensor data signals Vp flowing in the sensor data lines $P_\beta$ in response to the sensor data control signals CONT4. The sensing signal processor 800 processes, for example amplifies and filters the read analog sensor data signals Vp, and converts the processed analog sensor data signals Vp into digital sensor data signals DSN. The reading of the sensor data signals Vp by the sensing signal processor 800 is not necessarily performed every frame, and if necessary, it may be performed for a plurality of frames.

By repeating this procedure by a unit of one or more horizontal periods depending on the column resolution of the array of the sensing units SU, all sensor scanning lines $S_\alpha$ are sequentially supplied with the gate-on voltage/high voltage, thereby processing the sensor output signals from all the sensing units SU to generate the digital sensor signals DSN to output to the touch determination unit 900.

The touch determination unit 900 receives and processes the digital sensor data signals DSN from the sensing signal processor 800 for one frame to determine where a touch occurs, and then outputs information INF on the position of a touch to an external device (not shown). The external device transmits image signals R, G, and B to the LCD according to the information INF. Alternatively, the external device may receive the digital sensor signals DSN to determine whether and where a touch occurs. In this case, the touch determination unit 900 may be omitted.

The sensing operation may be performed independent of the display operation. That is, the sensing operation need not be performed every frame, but it may be performed every two or more frames.

Now, an exemplary LCD according to another exemplary embodiment of the present invention will be described with reference to FIG. 4 to FIG. 7.

Figure 4:
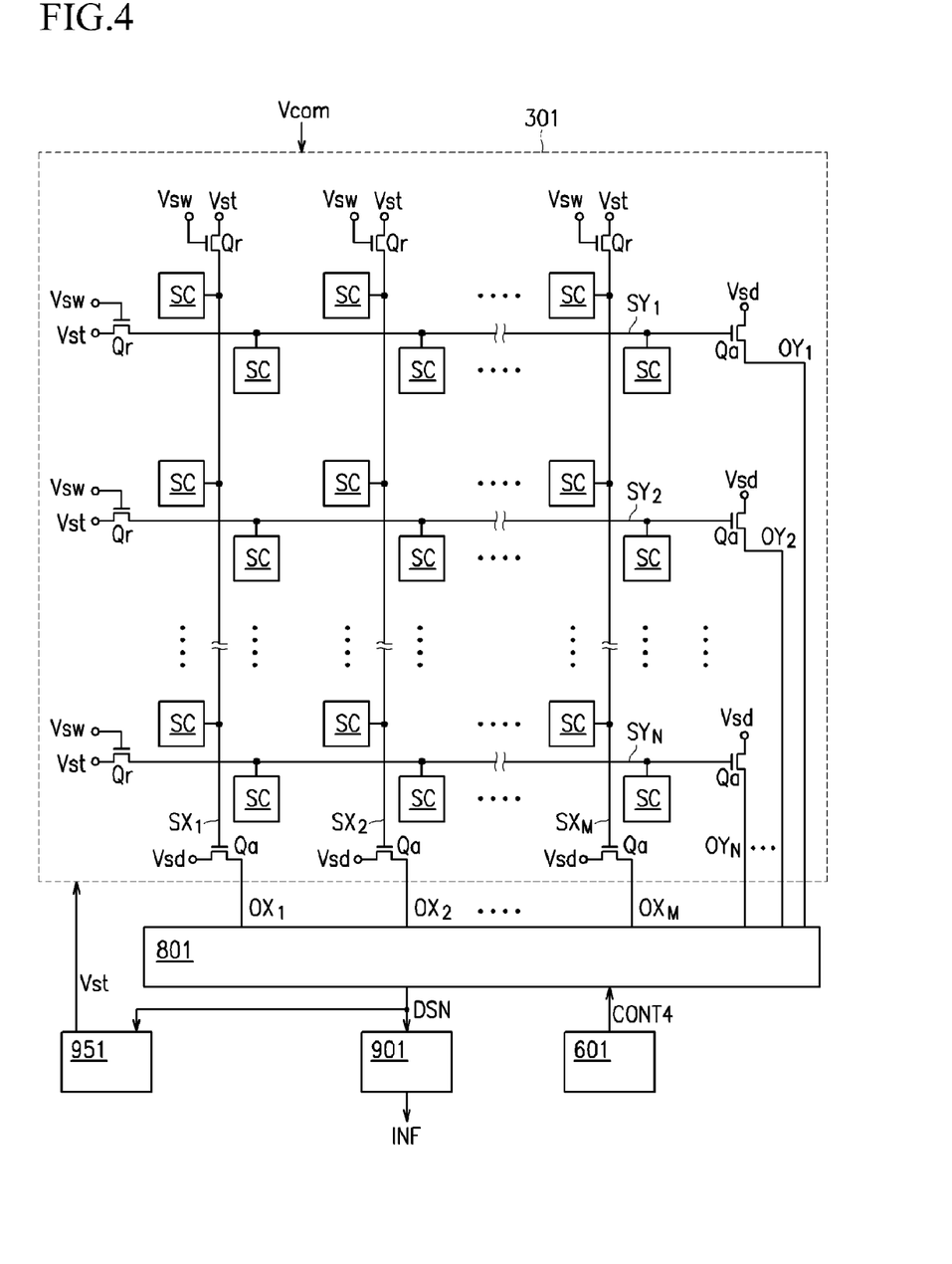
FIG. 4 is a block diagram of an exemplary LCD according to another exemplary embodiment of the present invention from the standpoint of an exemplary sensing unit of the exemplary LCD.

Referring to FIG. 4, the LCD includes a liquid crystal panel assembly 301, a sensing signal processor 801 and a compensation unit 951 connected to the LC panel assembly 301, a touch determination unit 901 connected to the sensing signal processor 801, and a signal controller 601 for controlling the above elements. The LCD further includes a display scanning driver, a display data driver, and a gray voltage generator although the above elements are not shown. The above elements may be substantially the same as those described in the previous embodiment, so detailed description thereof is omitted.

Figure 5:
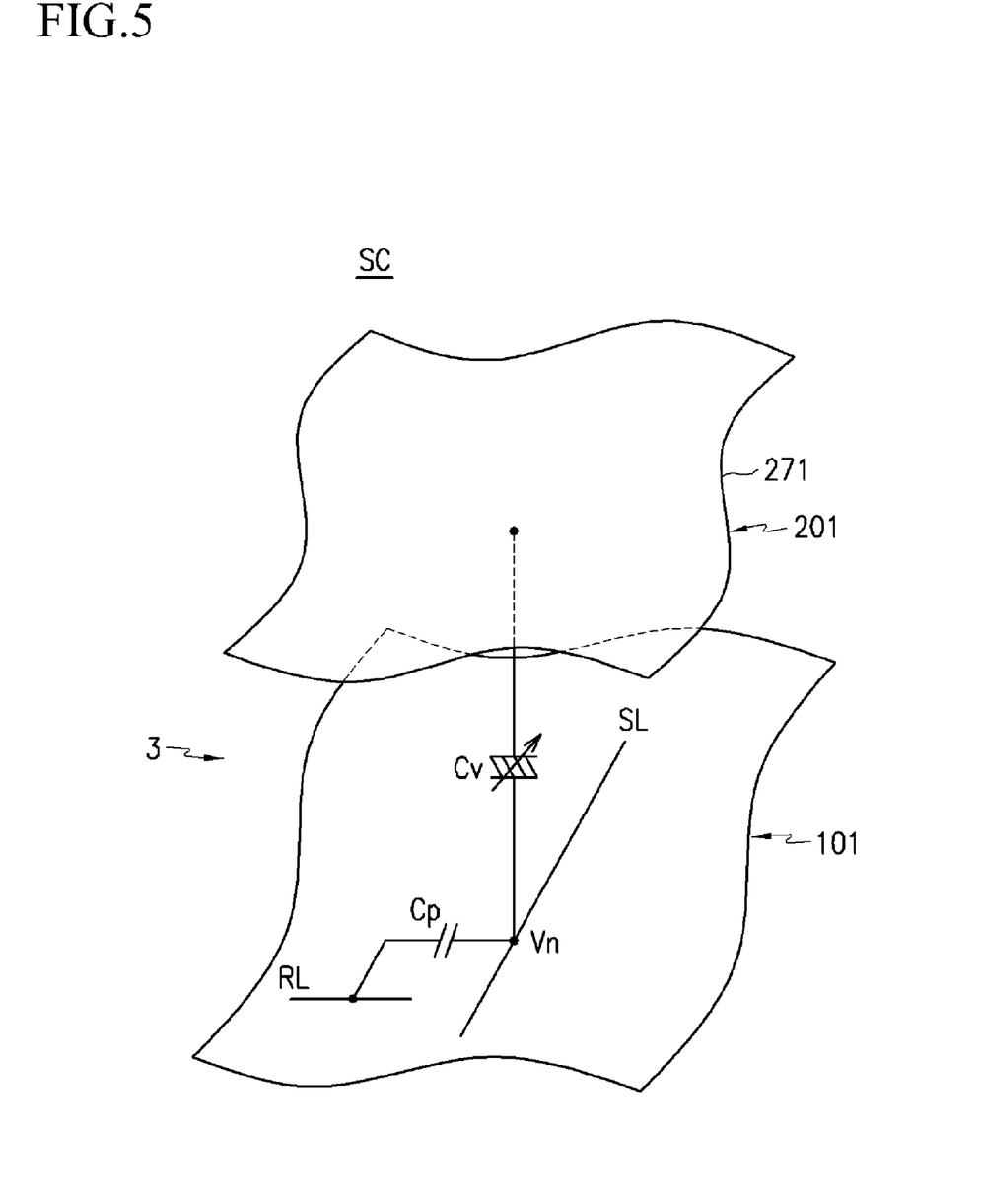
FIG. 5 is an equivalent circuit diagram of an exemplary sensing unit of an exemplary LCD according to another exemplary embodiment of the present invention.

Referring to FIG. 4, the LC panel assembly 301 includes a plurality of sensor signal lines $SY_1$-$SY_N$ and $SX_1$-$SX_M$, a plurality of sensing units SC, a plurality of reset transistors Qr, a plurality of output transistors Qa, and a plurality of output data lines $OY_1$-$OY_N$ and $OX_1$-$OX_M$. The LC panel assembly 301 further includes a plurality of display signal lines and a plurality of pixels connected thereto, although the above elements are not shown. The above elements according to the illustrated embodiment of FIG. 4 may be substantially the same as those described in the previous embodiment, so detailed description thereof is omitted. Referring to FIG. 5, the LC panel assembly 301 includes a TFT array panel 101, a common electrode panel 201, a liquid crystal layer 3, and a plurality of spacers (not shown).

Referring to FIG. 4, the sensor signal lines include a plurality of row sensor data lines $SY_1$-$SY_N$ and a plurality of column sensor data lines $SX_1$-$SX_M$ for transmitting sensor data signals. Referring to FIG. 5, the sensor signal lines further include a plurality of reference voltage lines RL transmitting a reference voltage Vref. Alternatively, the reference voltage lines RL may be omitted, and in this case the reference voltage Vref may be transmitted through the display signal lines.

The sensor signal lines $SY_1$-$SY_N$, $SX_1$-$SX_M$, and RL are disposed on the TFT array panel 100. The row sensor signal lines $SY_1$-$SY_N$ extend substantially in a row direction, a first direction, and substantially parallel to each other, while the column sensor data lines $SX_1$-$SX_M$ extend substantially in a column direction, a second direction, and substantially parallel to each other. The second direction may be substantially perpendicular to the first direction. The sensing units SC connected to the sensor signal lines $SY_1$-$SY_N$ and $SX_1$-$SX_M$ are arranged substantially in a matrix as shown in FIG. 4. Referring to FIG. 5, each of the sensing units SC includes a variable capacitor Cv and a reference capacitor Cp. The variable capacitor Cv is connected to a row sensor data line or a column sensor data line (referred as a sensor data line SL hereinafter), and the reference capacitor Cp is connected to the sensor data line SL and a reference voltage line RL.

The reference capacitor Cp includes the reference voltage line RL and the sensor data line SL that overlaps the reference voltage line RL via an insulator.

The variable capacitor Cv includes the sensor data line SL and the common electrode 271 disposed on the common electrode panel 201 as two terminals, and the LC layer 3 disposed between the two terminals SL and 271 functions as a dielectric of the variable capacitor Cv. The capacitance of the variable capacitor Cv is varied depending on an external impulse exerted on the liquid crystal panel assembly 301 such as user's touch, etc. One example of the external impulse may be a pressure. When a pressure is exerted on one of the TFT array panel 101 and the common electrode panel 201 to change the distance between the terminals of the variable capacitor Cv, the capacitance of the variable capacitor Cv is changed. The change of the capacitance of the variable capacitor Cv in turn changes the voltage Vn of a junction between the reference capacitor Cp and the variable capacitor Cv. The junction voltage Vn is transmitted as a sensor data signal Vp through the sensor data line SL, and it is determined whether a touch exists based on the sensor data signals Vp. Since the reference capacitor Cp has a constant capacitance and the reference voltage Vref applied to the reference capacitor Cp is constant, the junction voltage Vn varies in a range. Accordingly, the sensor data signals Vp may have a voltage level in a limited range, and thus whether and where a touch occurs may be easily determined.

Each of the sensing units SC may be disposed between two adjacent pixels. Every pair of a row sensor data line $SY_k$ (k=1, 2, . . . , N) and a column sensor data line $SX_l$ (l=1, 2, . . . , M) defines a pair of sensing units SC that are connected thereto and disposed near the intersection of the pair of the sensor data lines $SY_k$ and $SX_l$. The concentration of such pairs of sensing units SC may be approximately a quarter of the concentration of dots of the pixels. The concentration of the sensing units SC and the concentration of the pixels may be the same as those described in the previous embodiment.

Referring to FIG. 4, each pair of a reset transistor Qr and an output transistor Qa are connected to opposite ends of each of the sensor data lines $SY_1$-$SY_N$ and $SX_1$-$SX_M$.

Figure 6A:
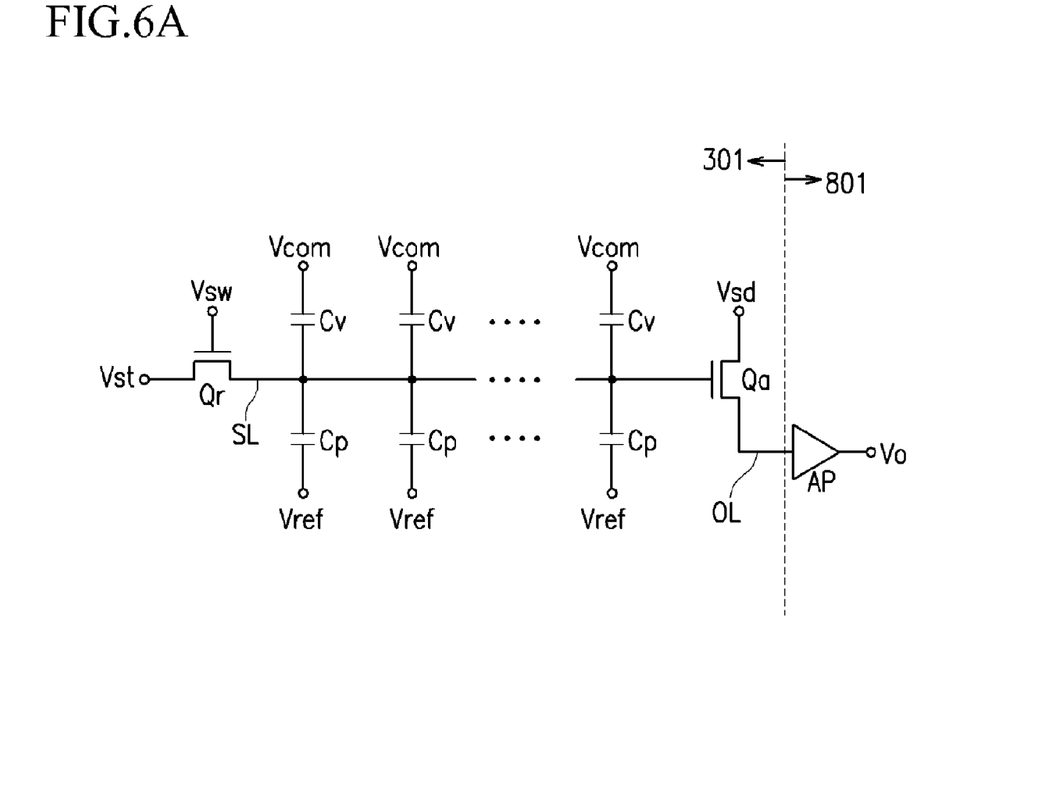
FIG. 6A is an equivalent circuit diagram of a plurality of exemplary sensing units connected to an exemplary sensing data line of an exemplary LCD according to another exemplary embodiment of the present invention.

Referring to FIG. 6A, the LC panel assembly 301 includes a plurality of sensor data lines SL, a plurality of sensing units SC connected to each sensor data line SL reset transistors Qr, and output transistors Qa, and output data lines OL connected to the output transistors Qa. Each sensing unit SC includes a variable capacitor Cv and a reference capacitor Cp. The variable capacitors Cv are connected to the common voltage Vcom from the common electrode 271, and the reference capacitors Cp are connected to a reference voltage Vref from the reference voltage line RL. The reset transistor Qr for each sensor data line SL has three terminals, i.e., a control terminal connected to a reset signal Vsw, an input terminal connected to a sensor control voltage Vst, and an output terminal connected to a sensor data line SL. The reset transistor Qr is disposed near on an edge of the LC panel assembly 301, where the pixels are not disposed, such as in a non-display area, and supplies the sensor control voltage Vst to the sensor data line SL in response to the reset signal Vsw.

The output transistors Qa also have three terminals, i.e., a control terminal connected to a sensor data line SL opposite a reset transistor Qr, an input terminal connected to an input voltage Vsd, and an output terminal connected to an output data line OL (representing $OY_1$-$OY_N$ and $OX_1$-$OX_M$). The output transistor Qa is also disposed near an edge of the LC panel assembly 301, and generates an indication signal based on the sensor data signal flowing in the sensor data line SL. One example of the indication signal is an output current. Alternatively, the output transistor Qa may generate a voltage as the indication signal. As shown in FIG. 4, the reset transistors Qr may be disposed on first and third sides of the LC panel assembly 301, and the output transistors Qa may be disposed on second and fourth sides of the LC panel assembly 301, where the second and fourth sides are opposite the first and third sides, respectively.

Referring to FIG. 4 again, the output data lines include a plurality of row output data lines $OY_1$-$OY_N$ and a plurality of column output data lines and $OX_1$-$OX_M$. The row output data lines $OY_1$-$OY_N$ are connected to the row sensor data lines $SY_1$-$SY_N$ through the output transistors Qa, and the column output data lines $OX_1$-$OX_N$ are connected to the column sensor data lines $SX_1$-$SX_M$ through the output transistors Qa. The output data lines $OY_1$-$OY_N$ and $OX_1$-$OX_M$ are connected to the sensing signal processor 801, and transmit the indication signals from the output transistors Qa to the sensing signal processor 801. The output data lines $OY_1$-$OY_N$ and $OX_1$-$OX_M$ may extend substantially in the column direction and substantially parallel to each other.

Figure 6B:
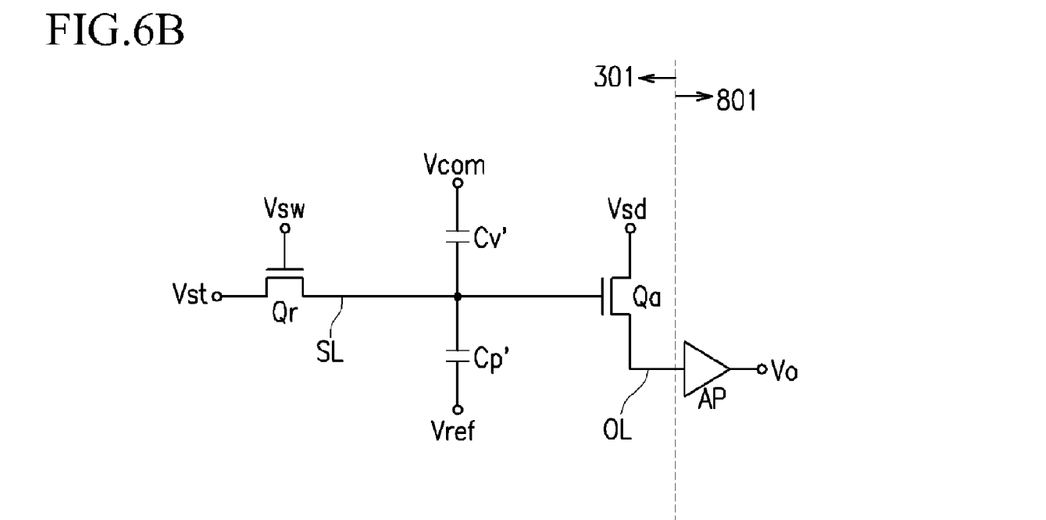
FIG. 6B is an equivalent circuit diagram briefly representing the exemplary sensing unit.

The sensing signal processor 801 is connected to the output data lines $OY_1$-$OY_N$ and $OX_1$-$OX_M$ of the LC panel assembly 301, and receives the indication signals transmitted through the output data lines $OY_1$-$OY_N$ and $OX_1$-$OX_M$. The sensing signal processor 801 processes, for example amplifies the indication signals to generate analog sensor signals Vo, and then analog-digital converts the analog sensor signals Vo to generate digital sensor signals DSN. Referring to FIG. 6A and FIG. 6B the sensing signal processor 801 includes a plurality of amplifiers AP. Each of the amplifiers AP is a current integrator for integrating the output current of an output transistor Qa for a predetermined time to generate an analog sensor signal Vo.

The touch determination unit 901 receives the digital sensor data signals DSN from the sensing signal processor 801, appropriately processes the received digital sensor data signals DSN to determine whether and where a touch occurs on the LC panel assembly 301, and sends information INF on a touch to an external device.

In the LCD according to the present embodiment, the longitudinal position of a touch is determined based on the sensor data signals flowing in the row sensor data lines $SY_1$-$SY_N$, and the transverse position of the touch is determined based on the sensor data signals flowing in the column sensor data lines $SX_1$-$SX_M$.

The compensation unit 951 receives the digital sensor signals DSN from the sensing signal processor 801, and adjusts the sensor control voltage Vst applied to the sensor data lines SL through the input terminals of the reset transistors Qr until the digital sensor signals DSN are bounded in a predetermined range. Alternatively, the compensation unit 951 may adjust the input voltage Vsd applied to the input terminals of the output transistors Qa to control the digital sensor signals DSN. While it has been described that the compensation unit 951 receives the digital sensor signals DSN from the sensing signal processor 801, the compensation unit 951 may alternatively receive the analog sensor signals before being converted into the digital sensor signals DSN from the sensing signal processor 801, and may then perform the above-described operation based on the analog sensor signals.

The signal controller 601 controls operations of the sensing signal processor 801, the compensation unit 951, etc.

Referring to FIG. 6A, the plurality of sensing units SC including a plurality of variable capacitors Cv and a plurality of reference capacitors Cp are connected to one sensor data line SL. The variable capacitors Cv can be represented by one variable capacitor Cv' shown in FIG. 6B, which includes the sensor data line SL as one terminal. Similarly, the reference capacitors Cp can be represented by one reference capacitor Cp' as shown in FIG. 6B.

Figure 7:
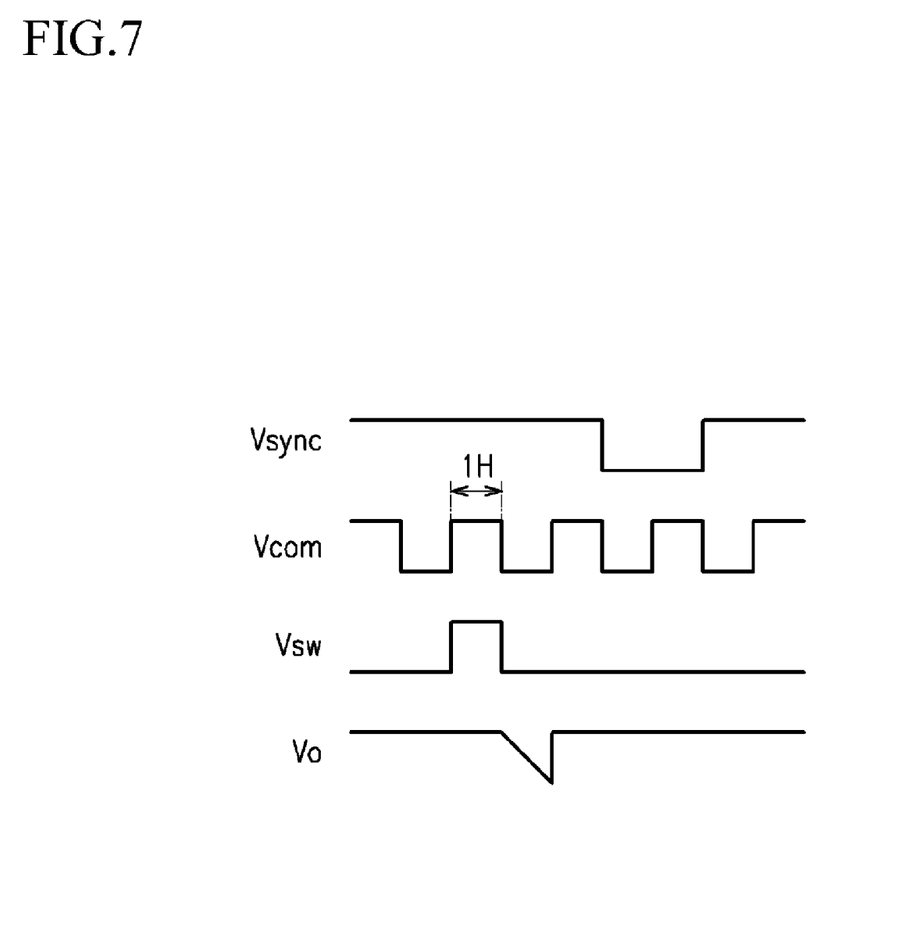
FIG. 7 is a timing diagram for a sensing operation of an exemplary LCD according to another exemplary embodiment of the present invention.

Referring to FIG. 7, the sensing operation of the LCD may be performed in porch periods between adjacent frames, and in particular, the sensing operation may preferably be performed in front porch periods preceding a low level voltage period of a vertical synchronization signal Vsync.

The common voltage Vcom swings between a high level and a low level every 1H.

The reset signal Vsw applied to the control terminal of each reset transistor Qr has a gate-on voltage for turning on the reset transistor Qr and a gate-off voltage for turning off the reset transistor Qr. The reset signal Vsw becomes the gate-on voltage when the common voltage Vcom is in the high level. When the gate-on voltage is applied to the reset transistor Qr via the control terminal thereof, the reset transistor Qr is turned on and the sensor control voltage Vst is applied to the sensor data line SL to be initialized.

When the reset signal Vsw becomes the gate-off voltage after 1H, the common voltage Vcom is changed to a low level. Then, the sensor data line SL becomes floating and the sensor data signal is changed based on the change of the capacitance of the variable capacitor Cv' and the change of the common voltage Vcom. The output transistor Qa outputs the indication signal in response to the sensor data signal, and the amplifier AP within the sensing signal processor 801 integrates the indication signal to generate the analog sensor signal Vo. After a predetermined time lapses, the sensing signal processor 801 reads the analog sensor signal Vo and digitizes the analog sensor signal Vo. Here, the reading of the analog sensor signal Vo may preferably be performed within 1H after the reset signal Vsw becomes the gate-off voltage. In other words, the analog sensor signal Vo may preferably be read before the common voltage Vcom becomes the high level again.

Since the sensor data signal may be varied based on the sensor control voltage Vst, the sensor data signal may have a voltage level of a limited range such that whether and where a touch occurs may be easily determined.

While it has been described that the reset signal Vsw becomes the gate-on voltage when the common voltage Vcom in the high level, in an alternative embodiment the reset signal Vsw may become the gate-on voltage when the common voltage Vcom is in the low level. In this case, the sensing signal processor 801 reads the analog sensor signal Vo after the common voltage Vcom becomes the high level and before the common voltage Vcom becomes the low level again. The reset signal Vsw may be synchronized with the display scanning signal applied to the last display scanning line within the LC panel assembly 301.

Many features of the LCD shown in FIG. 1 to FIG. 3B may also be applicable to the LCD shown in FIG. 4 to FIG. 7.

Now, an exemplary feedback control system for an exemplary LCD according to an exemplary embodiment of the present invention will be described with reference to FIG. 8 and FIG. 9.

Figure 8:
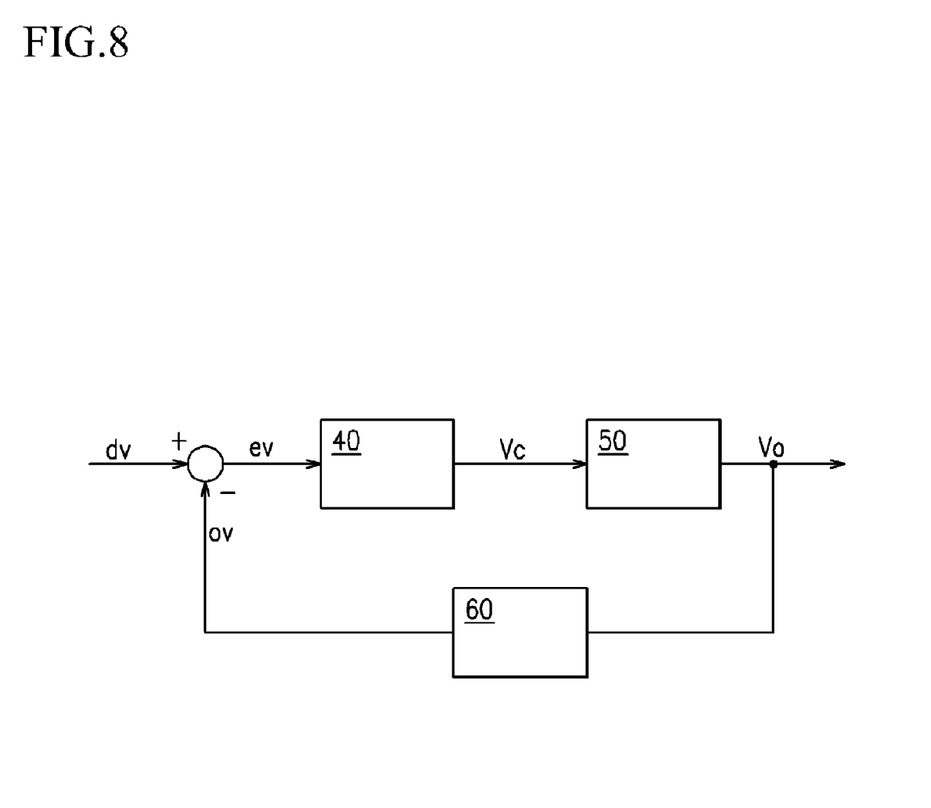
FIG. 8 is a block diagram of an exemplary feedback control system for the exemplary LCD shown in FIG. 1 to FIG. 7 according to an exemplary embodiment of the present invention.
Figure 9:
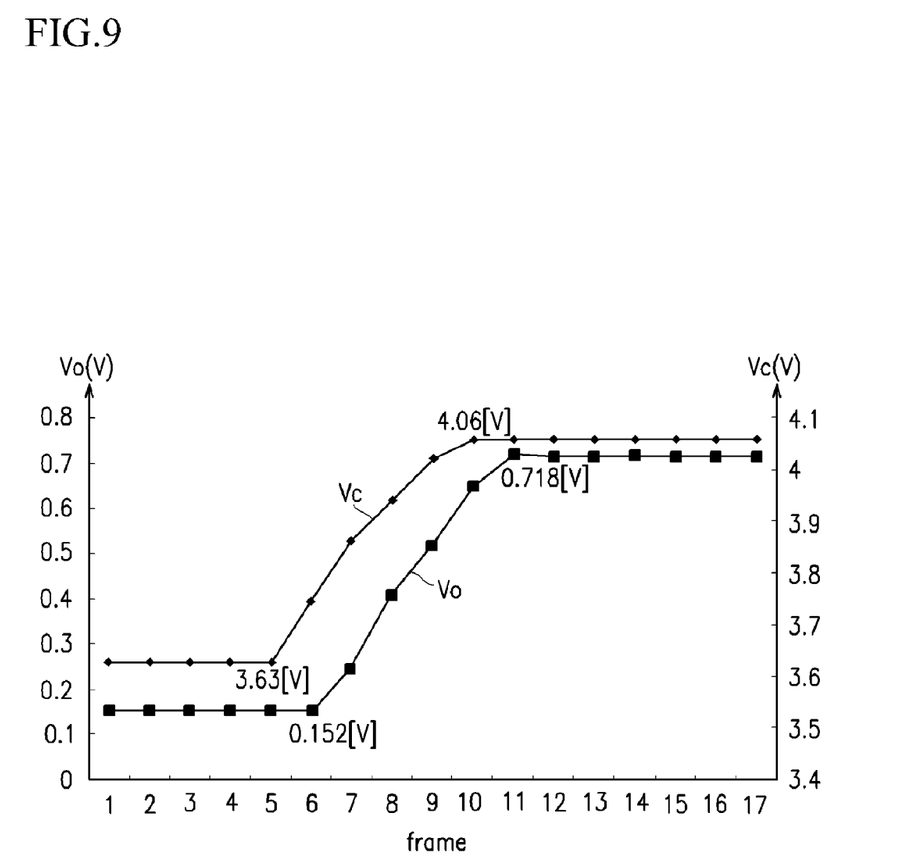
FIG. 9 is a graph illustrating experiment results for the exemplary feedback control of the exemplary LCD shown in FIG. 8.

FIG. 8 is a block diagram of an exemplary feedback control system for the exemplary LCDs shown in FIG. 1 to FIG. 7 according to an exemplary embodiment of the present invention, and FIG. 9 is a graph illustrating experiment results for the exemplary feedback control shown in FIG. 8.

As shown in FIG. 8, the LCD includes a regulating unit 40, a system 50, and a detecting unit 60 from the standpoint of feedback control. The regulating unit 40 includes the compensation unit 950 or 951. The system 50 includes the amplifiers AP of the sensing signal processor 800 or 801 and the LC panel assembly 300 or 301 including the sensing units SU or SC. The detecting unit 60 includes the sensing signal processor 800 or 801 except for the amplifiers AP.

The detecting unit 60 receives the sensing signals Vo from the system 50. The detecting unit 60 may then digitize the received sensing signals Vo to generate a feedback signal ov, and output the feedback signal ov to the regulating unit 40. The regulating unit 40 receives an operating signal ev, which is a difference between a target value dv and the feedback signal ov, and performs proportional control ("P control"), proportional-integral control ("PI control"), or proportional-integral-derivative control ("PID control") to generate a control signal Vc based on the operating signal ev. The system 50 receives the control signal Vc and outputs the sensing signals Vo. The above-described feedback control operation is repeated until the operating signal ev becomes "0".

The target value dv corresponds to the value of the sensing signal Vo that the system 50 would output. The control signal Vc makes the system 50 output the sensing signal Vo, and the control signal Vc corresponds to the sensor control voltage Vsg or Vst of the LCD. Alternatively the control signal Vc may correspond to the sensor input voltage Vsd applied to an input terminal of an output transistor Qa as described above. The feedback signal ov from the detecting unit 60 may correspond to the digital sensor signals DSN, but the feedback signal ov may alternatively correspond to the analog sensor signals Vo.

The regulating unit 40 calculates a control variable u in accordance with EQUATION 1 and generates the control signal Vc by calculating in accordance with EQUATION 2.

$$u(t) = Kp \times ev(t) + Ki \times \int_0^t ev(\tau)d\tau + Kd \times \frac{dev(\tau)}{d(\tau)} \quad \text{(Equation 1)}$$

$$Vc = Vc' + u(t) \quad \text{(Equation 2)}$$

Here, Kp denotes a proportional gain, Ki denotes an integral gain, Kd denotes a derivative gain, and Vc' denotes a previous value of the control signal Vc.

The proportional gain Kp, the integral gain Ki, and the derivative gain Kd may be appropriately determined by monitoring the output signal Vo of the system 50 for the control signal Vc.

When the derivative gain Kd is set to "0," the operation of the EQUATION 1 may be a PI controller. When the proportional gain Kp and the derivative gain Kd are both set to "0," the operation of the EQUATION 1 may be a P controller.

When the operating signal ev is within a predetermined range, the regulating unit 40 does not perform the operation of the EQUATION 1 and the EQUATION 2. That is to say, the regulating unit 40 determines that the sensing signal Vo is within a reliable range, and the regulating unit 40 does not perform the control operation. However, when the operating signal ev is beyond the predetermined range, the regulating unit 40 starts the control operation and continues the control operation until the operating signal ev becomes "0," i.e., until the feedback signal ov, which corresponds to the output signal Vo of the system 50, becomes equal to the target value dv.

Although EQUATION 1 and EQUATION 2 are presented in a continuous time domain, they can have equivalents in a discrete time domain.

One experimental result showing that the sensing signal Vo follows a predetermined value, i.e., an operating point for an LCD, according to an exemplary embodiment of the present invention is shown in FIG. 9. Here, the target value dv, i.e., the operating point of the sensing signal Vo, was about 0.7V, and a permissible error was about ±0.02V. That is, the predetermined range of the sensing signal Vo was set to about 0.5V to about 0.9V (0.7V±0.2V). The proportional gain Kp was about 2.2, the integral gain Ki was about 0.5, and the derivative gain Kd was about 0.

Referring to FIG. 9, the initial value of the sensing signal Vo was about 0.152V until the sixth frame, and the PI control was performed from the sixth frame. The sensing signal Vo became about 0.718V to reach the target value dv in the eleventh frame, after five frames from the sixth frame. In the meantime, the control signal Vc was changed by the regulating unit 40 from about 3.63V to about 4.06V for the five frames.

The sensing signal Vo under the occurrence of a touch was bounded by about ±0.05V from the value of the sensing signal Vo in the absence of a touch. Accordingly, once the sensing signal Vo reaches the operating point, the sensing signal Vo is bounded in a predetermined range, the control operation to follow the operating point is not performed again even though a touch occurs thereafter. As a result, the occurrence of a touch is determined based on the sensing signal Vo.

Even if there is degradation of the sensing units SU or SC, change of the sensing conditions, or the deviation of the LC panel assembly 300 or 301, the sensing signal Vo may be in a predetermined range by the feedback control, and therefore the touch sensing operation may be performed correctly.

The regulating unit 40 can be implemented as a digital circuit as well as an analog circuit. The regulating unit 40 may be included in the sensing signal processors 800 and 801 or the touch determination units 900 and 901, and particularly the regulating unit 40 may be implemented as programs to be executed by a processor (not shown) of the touch determination units 900 and 901. The regulating unit 40 may be implemented as a hardwired application specific integrated circuit ("ASIC") chip.

The regulating unit 40 may use control methods other than the PID control.

In the above-described embodiments, the photo-sensing element or the variable capacitor and the reference capacitor are described as the sensing unit, however other sensing units may be employed.

While an LCD has been described as the display device, the above-described embodiments can be also applied to other flat panel display devices such as a plasma display device, an organic light emitting diode ("OLED") display, a field emission display, etc.

Although preferred embodiments of the present invention have been described hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A display device comprising:
   a display panel unit;
   a sensing unit formed on the display panel unit, wherein the sensing unit comprises a sensing transistor for sensing light, and the sensing transistor comprises a control terminal which receives a sensing control voltage, an input terminal which receives a sensing input voltage and an output terminal which outputs a sensor data signal;
   a sensing signal processor which receives the sensor data signal to generate a sensing signal and generates a feedback signal based on the sensing signal; and
   a compensation unit which receives the feedback signal and adjusts at least one of the sensing control voltage and the sensing input voltage such that the sensing signal is bounded in a predetermined range,
   wherein the adjusted at least one of the sensing control voltage and the sensing input voltage is inputted to at least one of the control terminal and the input terminal of the sensing transistor to detect a touch.

2. The display device of claim 1, wherein the compensation unit controls the sensing signal when the sensing signal is outside of the predetermined range.

3. The display device of claim 1, wherein the compensation unit operates based on an operating signal which is a difference between a target value and the feedback signal.

4. The display device of claim 3, wherein the compensation unit does not adjust the at least one of the sensing control voltage and the sensing input voltage when the target value is equal to the feedback signal.

5. The display device of claim 1, wherein the compensation unit performs one of proportional control, proportional-integral control, and proportional-integral-derivative control.

6. The display device of claim 1, wherein the compensation unit is implemented as an analog circuit or a digital circuit.

* * * * *